(12) United States Patent
Nakashima et al.

(10) Patent No.: US 12,132,301 B2
(45) Date of Patent: Oct. 29, 2024

(54) ELECTRICAL JUNCTION BOX

(71) Applicant: Yazaki Corporation, Tokyo (JP)

(72) Inventors: Akinori Nakashima, Makinohara (JP); Hiroki Goto, Makinohara (JP); Takao Nogaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 159 days.

(21) Appl. No.: 17/893,545

(22) Filed: Aug. 23, 2022

(65) Prior Publication Data

US 2023/0069530 A1 Mar. 2, 2023

(30) Foreign Application Priority Data

Aug. 30, 2021 (JP) .................. 2021-140355

(51) Int. Cl.
| | | |
|---|---|---|
| H02G 3/16 | (2006.01) | |
| H01H 85/12 | (2006.01) | |
| H01H 85/20 | (2006.01) | |
| H02G 3/08 | (2006.01) | |
| B60R 16/023 | (2006.01) | |
| H01H 85/00 | (2006.01) | |

(52) U.S. Cl.
CPC ............ *H02G 3/081* (2013.01); *H01H 85/12* (2013.01); *H01H 85/20* (2013.01); *H02G 3/16* (2013.01); *B60R 16/0238* (2013.01); *H01H 2085/0034* (2013.01)

(58) Field of Classification Search
CPC ...... H02G 3/081; H02G 3/16; B60R 16/0238; H05K 2201/10181; H01H 85/12; H01H 69/02; H01H 85/044; H01H 85/20; H01H 2085/0034; H01H 2085/025; H01H 2085/0555; H01H 2085/208
See application file for complete search history.

(56) References Cited

U.S. PATENT DOCUMENTS

2011/0299229 A1* 12/2011 De La Reza ....... B60R 16/0238
361/624
2013/0280952 A1* 10/2013 Saimoto ................. H01R 9/226
439/527

(Continued)

FOREIGN PATENT DOCUMENTS

| JP | 2003-125516 A | 4/2003 |
|---|---|---|
| JP | 2013-034284 A | 2/2013 |

(Continued)

OTHER PUBLICATIONS

English Translation EP1646063, Yazaki Corporation, Hideki et al. Published Dec. 4, 2006 (Year: 2006).*

*Primary Examiner* — Steven T Sawyer
(74) *Attorney, Agent, or Firm* — Sughrue Mion, PLLC (57) ABSTRACT

An electrical junction box includes a case body having a plurality of connector portions, a power supply side circuit board accommodated in the case body and a spare connector mounting portion provided in an upper portion of the case body and configured such that a spare connector is attached to and detached from the spare connector mounting portion. The spare connector includes a fuse configured to electrically connect the power supply side circuit board to a device side terminal connected to an end of an electric wire configured to be electrically connected to an electronic device.

6 Claims, 12 Drawing Sheets

(56) References Cited

U.S. PATENT DOCUMENTS

| | | | |
|---|---|---|---|
| 2014/0291013 A1 | 10/2014 | Higuchi et al. | |
| 2015/0279583 A1* | 10/2015 | Matsumura | H01H 9/0207 200/293 |
| 2015/0382497 A1* | 12/2015 | Kawamura | H05K 7/14 361/728 |
| 2016/0049779 A1* | 2/2016 | Kawamura | H02G 3/088 174/541 |
| 2017/0063053 A1 | 3/2017 | Muto et al. | |
| 2018/0019085 A1* | 1/2018 | Kawase | H01H 85/12 |
| 2020/0153128 A1* | 5/2020 | Kakimi | B60R 16/0215 |

FOREIGN PATENT DOCUMENTS

| | | |
|---|---|---|
| JP | 2014-193073 A | 10/2014 |
| JP | 2015-231309 A | 12/2015 |
| JP | 2018-10768 A | 1/2018 |

* cited by examiner

FIG. 12

ELECTRICAL JUNCTION BOX

CROSS-REFERENCE TO RELATED APPLICATION

The present application claims priority to Japanese Patent Application No. 2021-140355 filed on Aug. 30, 2021, the entire content of which is incorporated herein by reference.

TECHNICAL FIELD

The presently disclosed subject matter relates to an electrical junction box.

BACKGROUND

A related art electrical junction box is capable of dealing with a difference in vehicle type or grade in a flexible manner and further reducing man-hours for development and manufacturing cost (see JP2014-193073A). In an electrical junction box including an electric circuit connected to a load provided on a vehicle body, the electrical junction box includes a plurality of types of optional units each including an additional circuit selectively used according to a vehicle type or grade with respect to a base unit including a common circuit commonly used for a plurality of vehicle types or grades. When the optional unit is selectively combined with the base unit, an electric circuit is formed by the common circuit of the base unit and the additional circuit of the selected optional unit. The base unit and the selected optional unit are attached to a case made of a synthetic resin prepared for each vehicle type or grade and are fixed to the vehicle body.

In addition, an electrical junction box that can be used across vehicle types has been proposed (see JP2015-231309A). The electrical junction box includes an electrical junction box casing (case body), a common relay block, an individual corresponding relay block, a common power supply block, and an individual corresponding semiconductor module. The individual corresponding semiconductor module and one or more blocks of the common relay block, the individual corresponding relay block, and the common power supply block are accommodated in an accommodating chamber of the electrical junction box casing, and the not accommodated blocks are accommodated in an accommodating chamber formed in the accommodated blocks.

However, in the electrical junction box of the related art, in order to take the power supply later, it is necessary to detach a lower cover from a casing of the electrical junction box and disassemble the electrical junction box, which requires complicated work.

SUMMARY

Illustrative aspects of the presently disclosed subject matter provide an electrical junction box in which an external power supply can be easily taken without complicated operation.

According to an illustrative aspect of the presently disclosed subject matter, an electrical junction box includes a case body having a plurality of connector portions, a power supply side circuit board accommodated in the case body and a spare connector mounting portion provided in an upper portion of the case body and configured such that a spare connector is attached to and detached from the spare connector mounting portion. The spare connector includes a fuse configured to electrically connect the power supply side circuit board to a device side terminal connected to an end of an electric wire configured to be electrically connected to an electronic device.

Other aspects and advantages of the presently disclosed subject matter will be apparent from the following description, the drawings and the claims.

DESCRIPTION OF EMBODIMENTS

Figure 1:
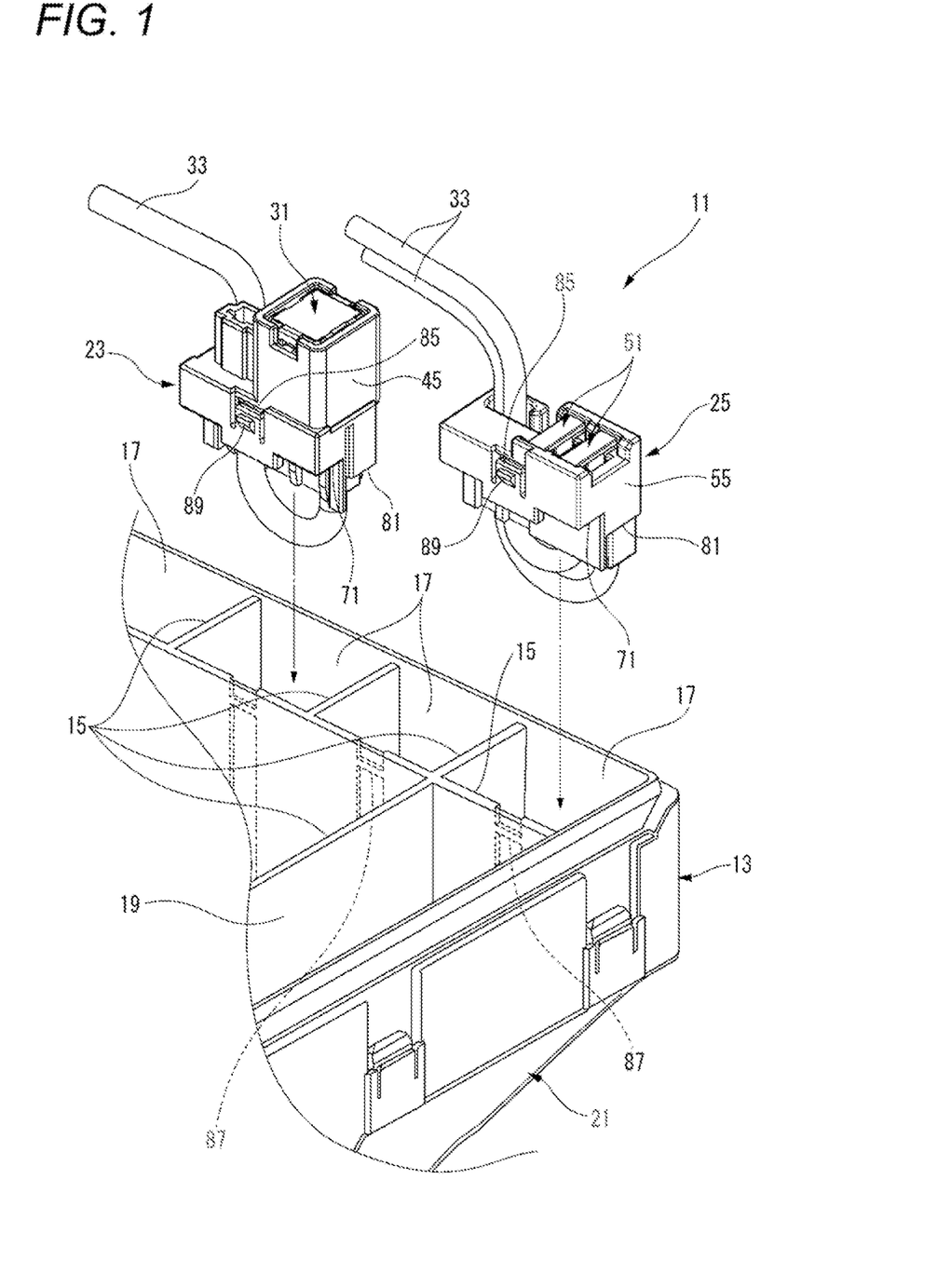
FIG. 1 is an exploded perspective view of main parts of an electrical junction box according to an embodiment of the presently disclosed subject matter.

Hereinafter, an embodiment according to the presently disclosed subject matter will be described with reference to the drawings. FIG. 1 is an exploded perspective view of main parts of an electrical junction box 11 according to an embodiment of the presently disclosed subject matter. For example, a "fuse block" in which a large number of fuses can be inserted and removed is used for a power transmission line of a vehicle in order to protect electric circuits of various electronic devices. Since the fuse block may have a relay and the like, the fuse block is also called a "relay box" or a "junction block". In the present specification, the fuse block, the relay box, and the junction block are collectively referred to as an electrical junction box 11.

The electrical junction box 11 according to the present embodiment includes a case body 13 forming an outer shell, a power supply side circuit board 10 provided integrally with the case body 13, a lower cover 21 covering a lower opening of the case body 13, and an upper cover (not shown)

covering an upper opening of the case body 13. A plurality of connector portions to which electric components such as a fuse and a fusible link are mounted are provided on, for example, an upper face of the case body 13. Further, spare connector mounting portions that allow a fusible link socket 23 and a fuse socket 25, which are spare connectors, to be detachably attached are provided at an upper portion of the case main body 13.

In the present embodiment, the spare connector mounting portions are spare connector mounting portions 17 and a spare block mounting portion 19 which are box-shaped recessed portions opening on the upper face of the case body 13 obtained by partitioning the case body 13 by a plurality of partition walls 15. In the spare connector mounting portions 17 and the spare block mounting portion 19, a terminal portion 14 (see FIG. 2) and a terminal coupling portion 12 (see FIG. 9) in the power supply side circuit board 10 formed by bending or cutting a plate-shaped busbar are disposed respectively. The terminal portion 14 and the terminal coupling portion 12 of the power supply side circuit board 10 are electrically connected to power supply side terminals of a blade fuse 51 and a fusible link 31 to be mounted.

The upper cover covers the electric components mounted on an upper portion of the case body 13, and the lower cover 21 derives an electric wire from a lower portion of the case body 13.

In the electrical junction box 11 according to the present embodiment, spare connectors are mounted on the spare connector mounting portion 17. In the present embodiment, the spare connectors are the fusible link socket 23 and the fuse socket 25. Further, the spare connectors may be mounted on the spare block mounting portion 19 as the spare connector mounting portion via a spare connector connection block 27 (see FIG. 9) to be described later.

Figure 2:
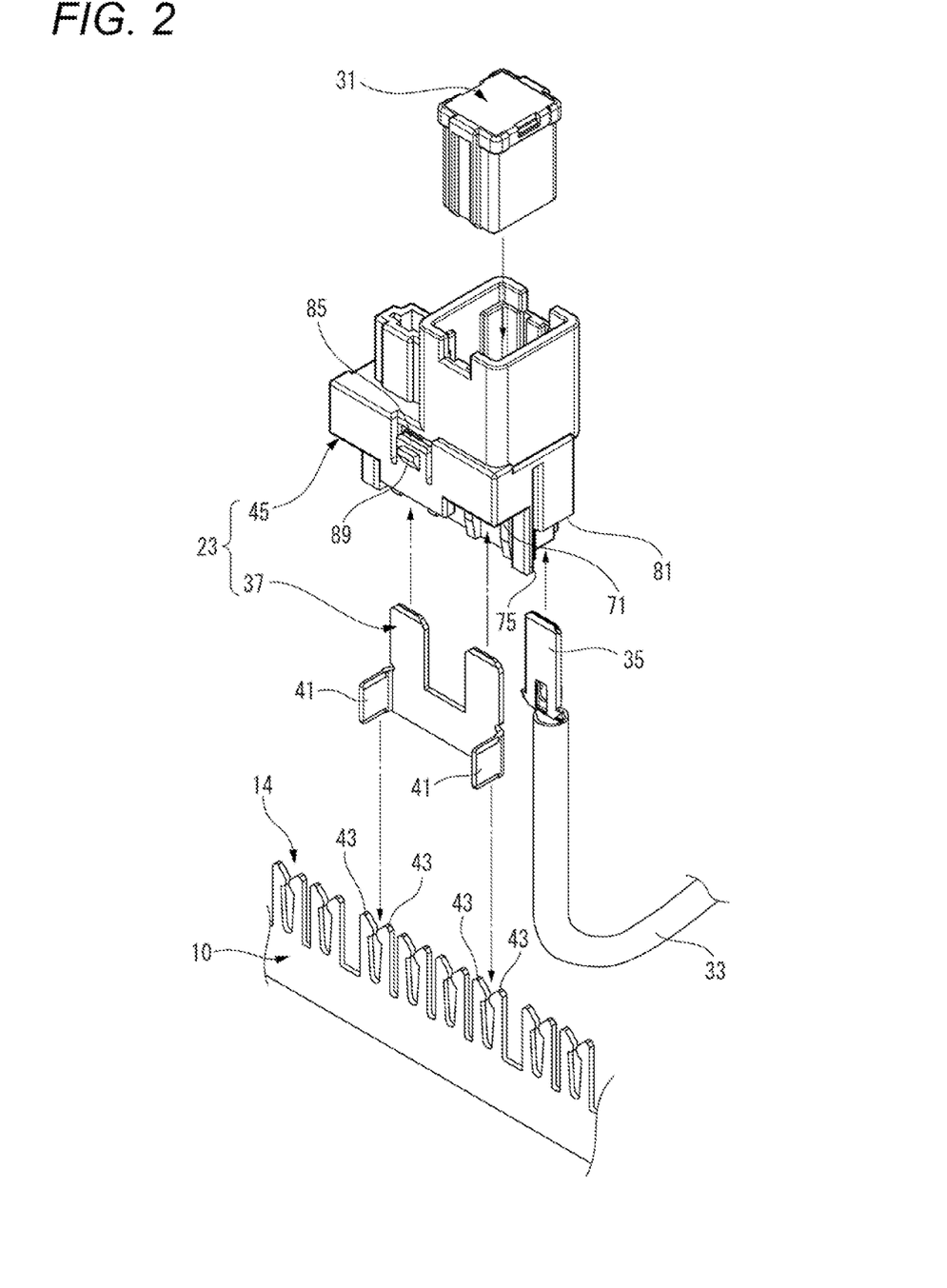
FIG. 2 is an exploded perspective view of a fusible link socket shown together with a power supply side circuit board.

FIG. 2 is an exploded perspective view of the fusible link socket 23 shown together with the power supply side circuit board 10. The fusible link 31 is mounted on the fusible link socket 23. The fusible link 31 electrically connects a device side terminal 35 connected to an end of an electric wire 33 electrically connected to an electronic device and the terminal portion 14 as a part of the terminal connection portions of the power supply side circuit board 10.

In the fusible link socket 23, a power supply side connection terminal 37 is mounted in a fusible link socket housing 45 made of an insulating resin. The power supply side connection terminal 37 is electrically connected to a power supply side terminal (not shown) of the fusible link 31 mounted on the fusible link socket 23. The power supply side connection terminal 37 includes electric contact pieces 41 which are a pair of tab terminals. Each of the pair of electric contact pieces 41 is inserted between a pair of different holding pieces 43 of the terminal portion 14 which is a tuning fork terminal and is conducted. Further, the device side terminal 35 is mounted on the fusible link socket 23. The device side terminal 35 is electrically connected to a load side terminal (not shown) of the fusible link 31.

Figure 3:
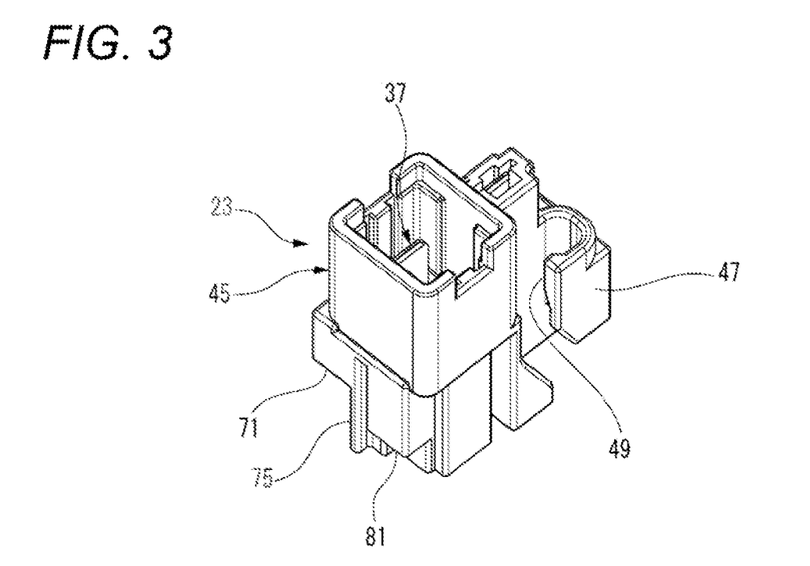
FIG. 3 is a perspective view showing the fusible link socket.

FIG. 3 is a perspective view showing the fusible link socket 23. In the electrical junction box 11, the fusible link socket housing (connector housing) 45 in the fusible link socket 23 has an electric wire holding portion 47. The electric wire holding portion 47 is formed in a C shape in the plan view, and one end of the electric wire holding portion 47 sandwiching an electric wire insertion port 49 is connected to a side face of the fusible link socket housing 45. The other end of the electric wire holding portion 47 serves as a free end.

The electric wire 33 can be inserted from the electric wire insertion port 49 to the electric wire holding portion 47 in a direction perpendicular to an extending direction. In the electric wire holding portion 47, the electric wire 33 connected to the device side terminal 35 accommodated in the fusible link socket housing 45 and extending toward a lower side of the fusible link socket housing 45 can be held in a state of being pulled out to an upper side of the fusible link socket housing 45.

Figure 4:
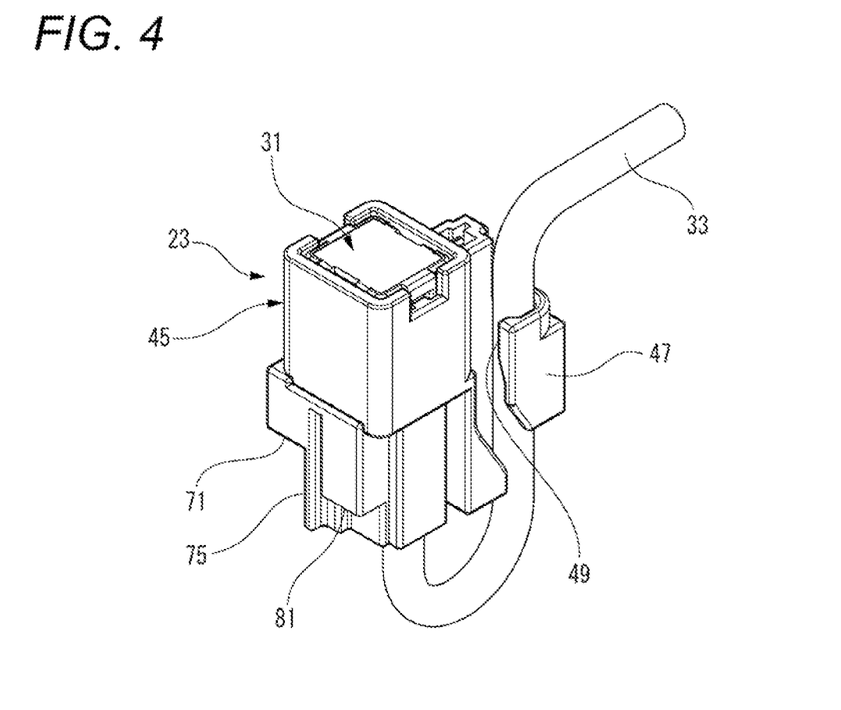
FIG. 4 is a perspective view showing the fusible link socket in which an electric wire pulled out from a lower side of a connector housing is led toward an upper side by an electric wire holding portion.

FIG. 4 is a perspective view showing the fusible link socket 23 in which the electric wire 33 pulled out from the lower side of the fusible link socket housing 45 is led toward the upper side by the electric wire bolding portion 47. In the fusible link socket 23, the electric wire 33 pulled out from the lower side of the fusible link socket housing 45 is inserted into the electric wire insertion port 49 and led out to an upper portion of the fusible link socket housing 45. Therefore, the electric wire 33 is led out by being turned to the upper portion in a state of being bent by 180 degrees between a lower portion of the fusible link socket housing 45 and the electric wire holding portion 47.

Figure 5:
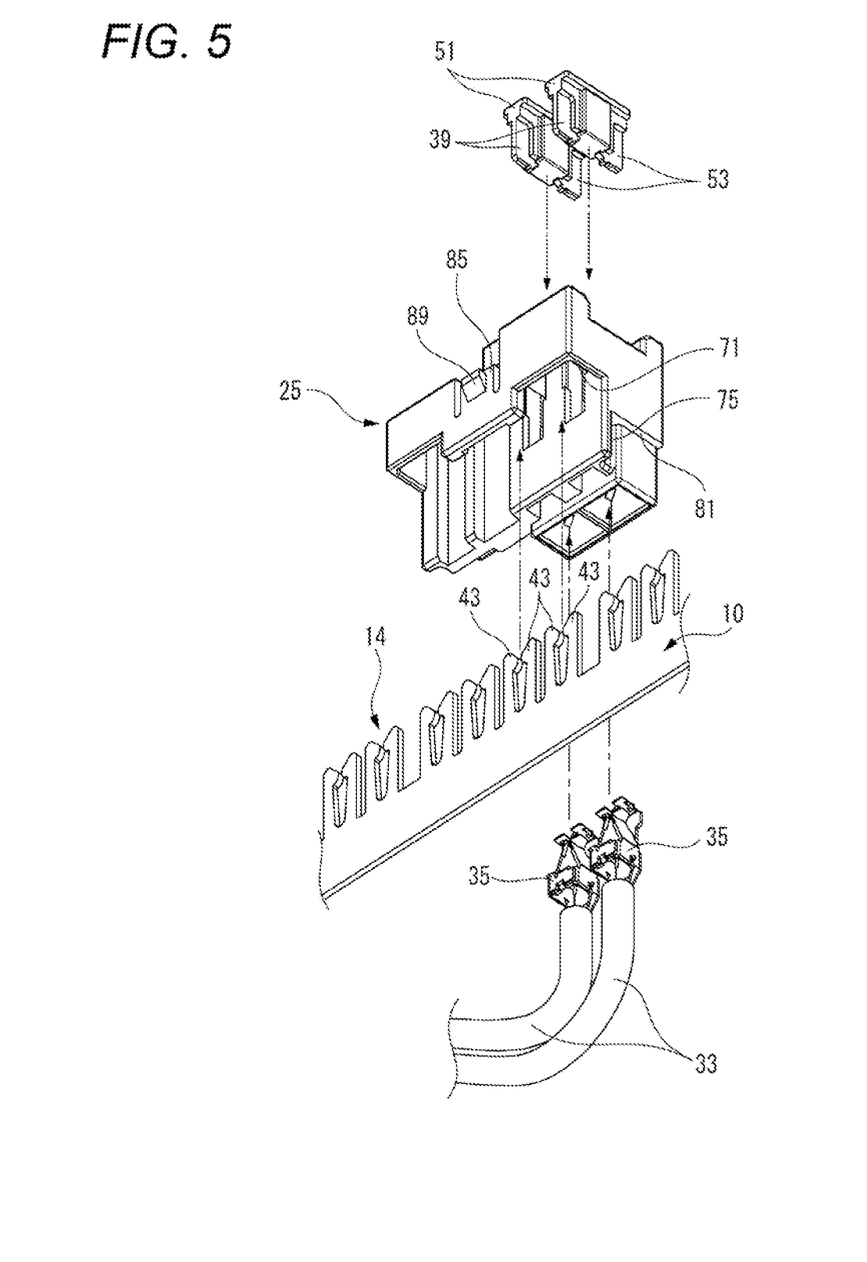
FIG. 5 is an exploded perspective view of a fuse socket shown together with the power supply side circuit board.

FIG. 5 is an exploded perspective view of the fuse socket 25 shown together with the power supply side circuit board 10. The fuse socket 25 can also be mounted on the spare connector mounting portion 17. A power supply side terminal 39 of respective blade fuses 51 mounted on the fuse socket 25 is inserted and conducted between a pair of holding pieces 43 different from the terminal portion 14 of the power supply side circuit board 10) accommodated in the case body 13.

Further, the device side terminal 35 attached to the end of the electric wire 33 is inserted into the fuse socket 25. The device side terminal 35 inserted into the fuse socket 25 is directly connected to a load side terminal 53 of the blade fuse 51 in the fuse socket 25.

Figure 6:
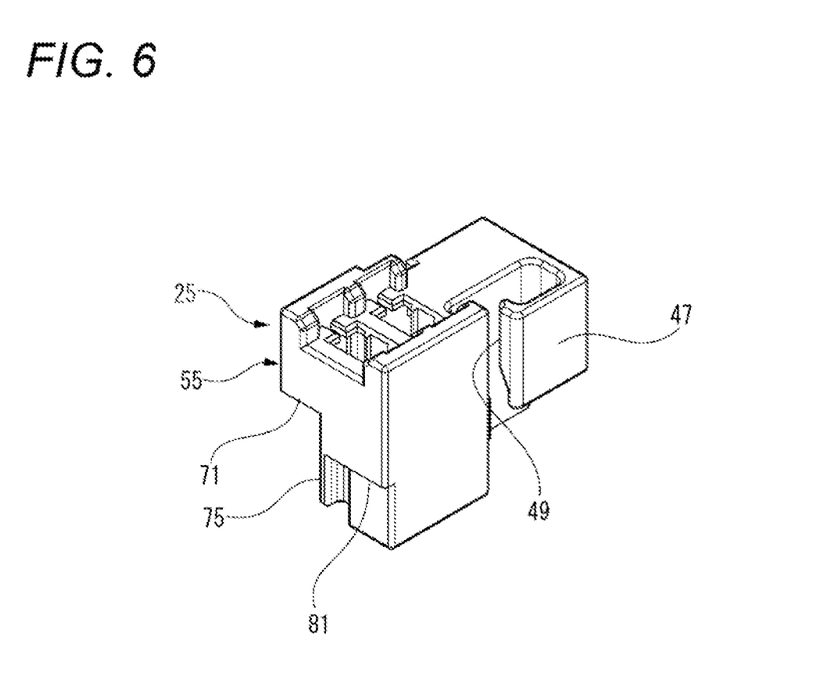
FIG. 6 is a perspective view showing the fuse socket.

FIG. 6 is a perspective view showing the fuse socket 25. In the case of the fuse socket 25, similarly to the fusible link socket 23, a fuse socket housing (connector housing) 55 made of an insulating resin in the fuse socket 25 includes the electric wire holding portion 47. The electric wire holding portion 47 is formed in a C shape in the plan view, and the electric wire 33 can be inserted from the electric wire insertion port 49 to the electric wire holding portion 47 in a direction perpendicular to an extending direction.

Figure 7:
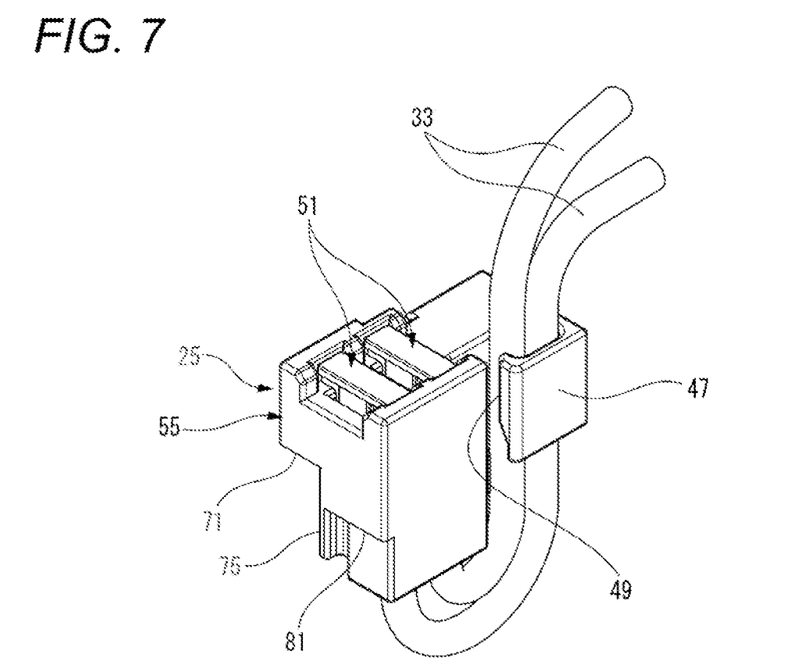
FIG. 7 is a perspective view showing the fuse socket in which electric wires pulled out from the lower side of the connector housing are led toward the upper side by the electric wire holding portion.

FIG. 7 is a perspective view showing the fuse socket 25 in which the electric wire 33 pulled out from the lower side of the fuse socket housing 55 is led toward the upper side by the electric wire holding portion 47. In the fuse socket 25, the electric wire 33 pulled out from the lower side of the fuse socket housing SS is inserted into the electric wire insertion port 49 and led out to an upper portion of the fuse socket housing 55. Therefore, the electric wire 33 is led out to the upper portion in a state of being bent by 180 degrees between a lower portion of the fuse socket housing 55 and the electric wire holding portion 47.

Figure 8:
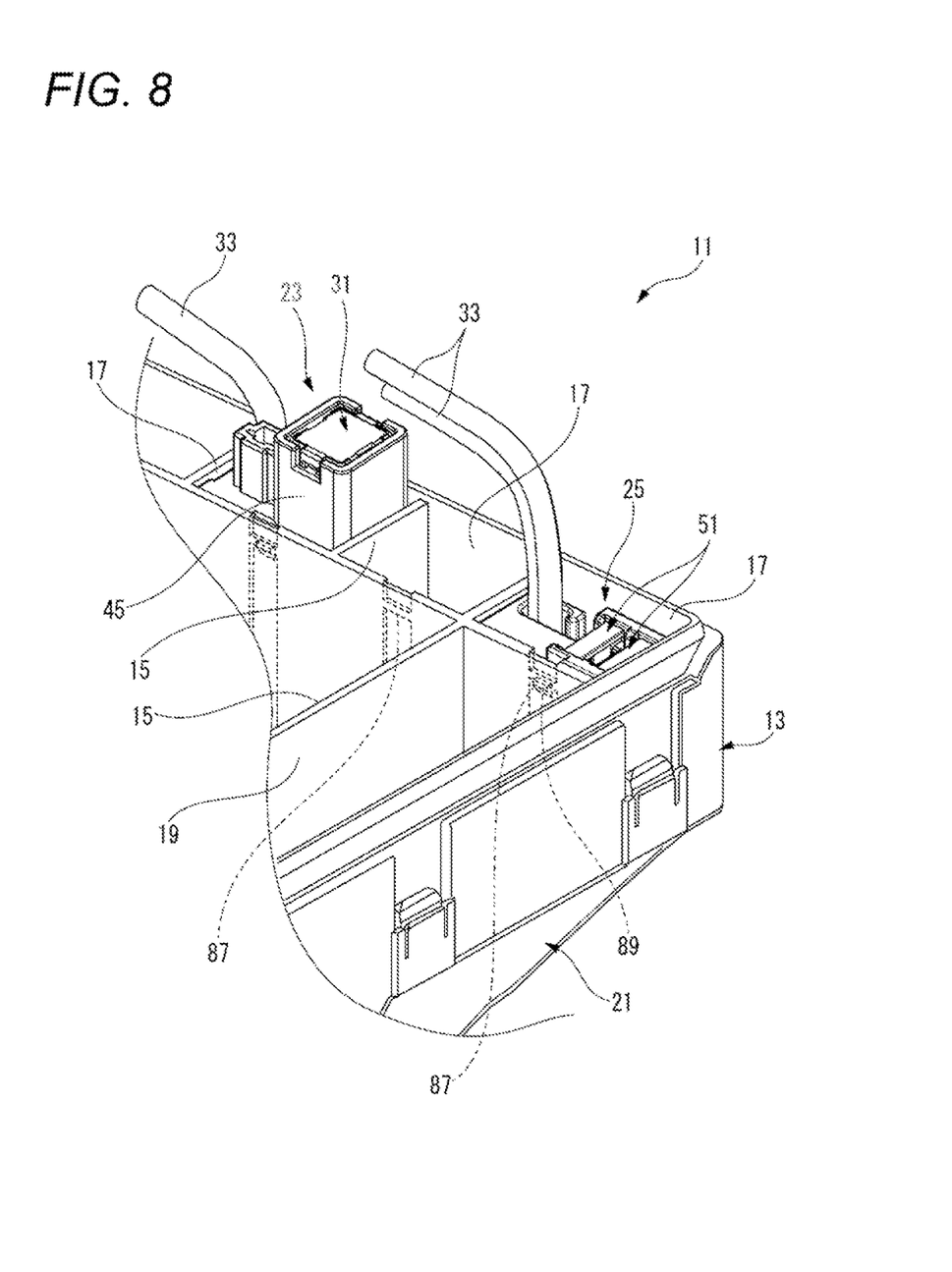
FIG. 8 is an enlarged perspective view of main parts of a case body showing a state in which the fusible link socket and the fuse socket are mounted on a spare connector mounting portion.

FIG. 8 is an enlarged perspective view of main parts of the case body 13 showing a state in which the fusible link socket 23 and the fuse socket 25 are mounted on a spare connector mounting portion 17. In the electrical junction box 11 according to the present embodiment, in a case where it is necessary to secure a power supply when an option, an after-part, or the like is added, the fusible link socket 23 and the fuse socket 25 are inserted into the spare connector mounting portion 17 of the case body 13. Accordingly, the power supply via the fusible link 31 and the blade fuse 51 can be easily taken out from the electrical junction box 11 later.

Note that the electric wire 33 led out from the fusible link socket 23 and the fuse socket 25 to the upper portion of the case body 13 is led out to the outside of the electrical junction box 11 from, for example, between the case body 13 and the upper cover, or from an outlet opening provided in a side cover.

Figure 9:
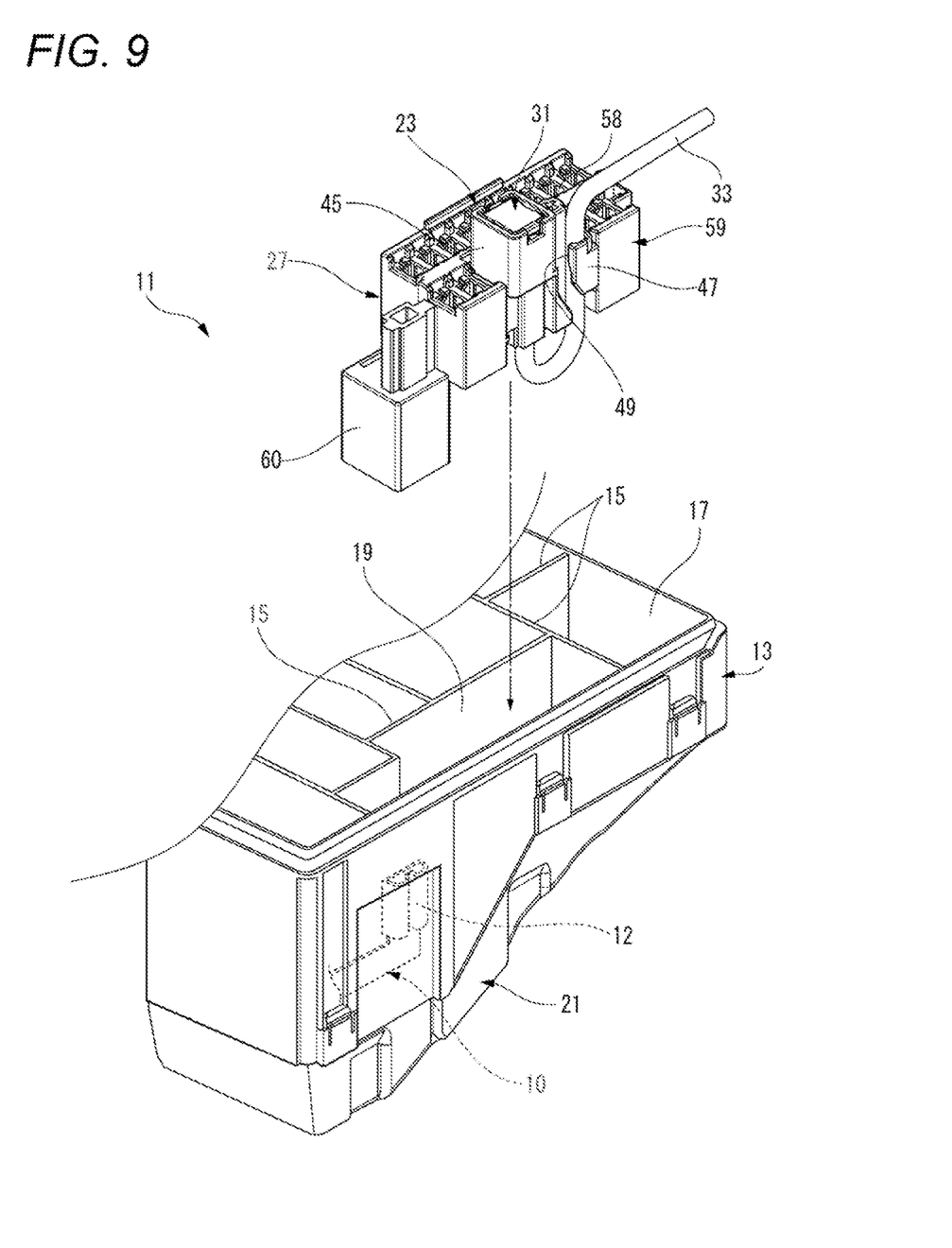
FIG. 9 is a perspective view showing the fusible link socket to be mounted on the spare connector mounting portion of the case body via a spare connector connection block.

FIG. 9 is a perspective view showing the fusible link socket 23 mounted on the spare block mounting portion 19 of the case body 13 via the spare connector connection block 27. One of the spare connector mounting portions provided in the upper portion of the case body 13 in the electrical junction box 11 may be, for example, the spare block mounting portion 19 shown in FIG. 1. The spare connector connection block 27 shown in FIG. 9 is mounted on the spare block mounting portion 19.

The fusible link socket 23 or the fuse socket 25 is selectively mounted on the spare block mounting portion 19 via the spare connector connection block 27. A connector mounting portion 57 is formed in the spare connector connection block 27. The fusible link socket 23 or the fuse socket 25 can be selectively mounted on the connector mounting portion 57.

Figure 10:
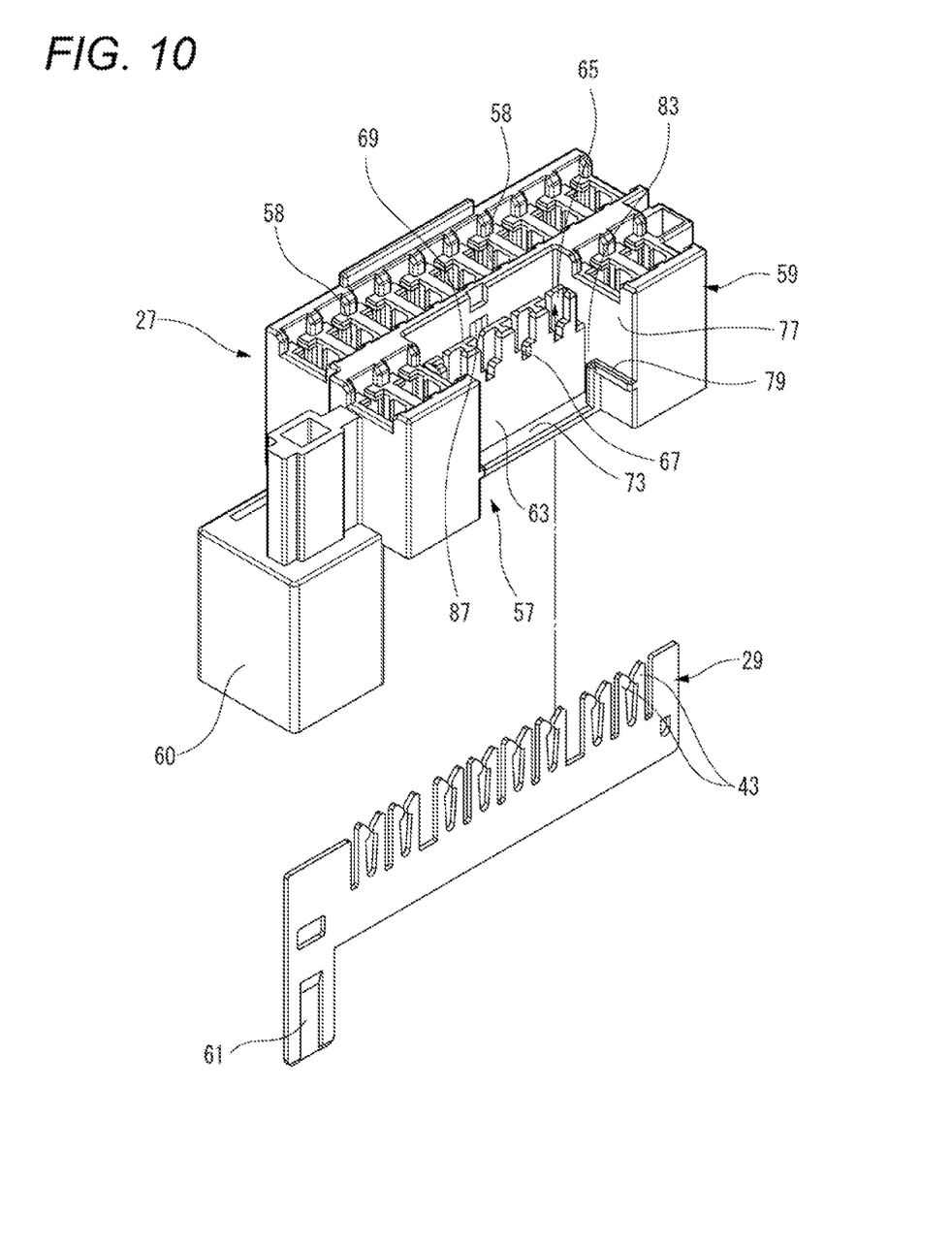
FIG. 10 is an exploded perspective view of the spare connector connection block.

2.5 FIG. 10 is an exploded perspective view of the spare connector connection block 27. In the spare connector connection block 27, a housing body 59 formed of an insulating resin is formed in a rectangular shape in a plan view. A busbar connection housing portion 60 having a substantially square shape in a plan view is integrally formed at one end of the housing body 59 in a longitudinal direction. In the busbar connection housing portion 60, a busbar connection portion 61 (see FIG. 10) of a tuning fork terminal 29 connected to the terminal coupling portion 12 of the power supply side circuit board 10 accommodated in the case body 13 is accommodated. In addition to the connector mounting portion 57, the housing body 59 is provided with a plurality of fuse mounting portions 58 for mounting, for example, the blade fuse 51 and the like.

The tuning fork terminal 29 connected to the power supply side circuit board 10 is mounted on the housing body 59. That is, in the spare connector connection block 27 mounted on the case body 13 housing the power supply side circuit board 10, the tuning fork terminal 29 is connected to the power supply side circuit board 10 of the case body 13 via the busbar connection portion 61.

In the tuning fork terminal 29, which is a part of the terminal connecting portions of the power supply side circuit board 10, a plurality of pairs (eight pairs in the present embodiment) of holding pieces 43 standing in a tuning fork shape are formed along the longitudinal direction of the housing body 59. The tuning fork terminal 29 is electrically connected to the power supply side connection terminal 37 of the fusible link socket 23 or the power supply side terminal 39 of the blade fuse 51 inserted between a pair of holding pieces 43.

Figure 11:
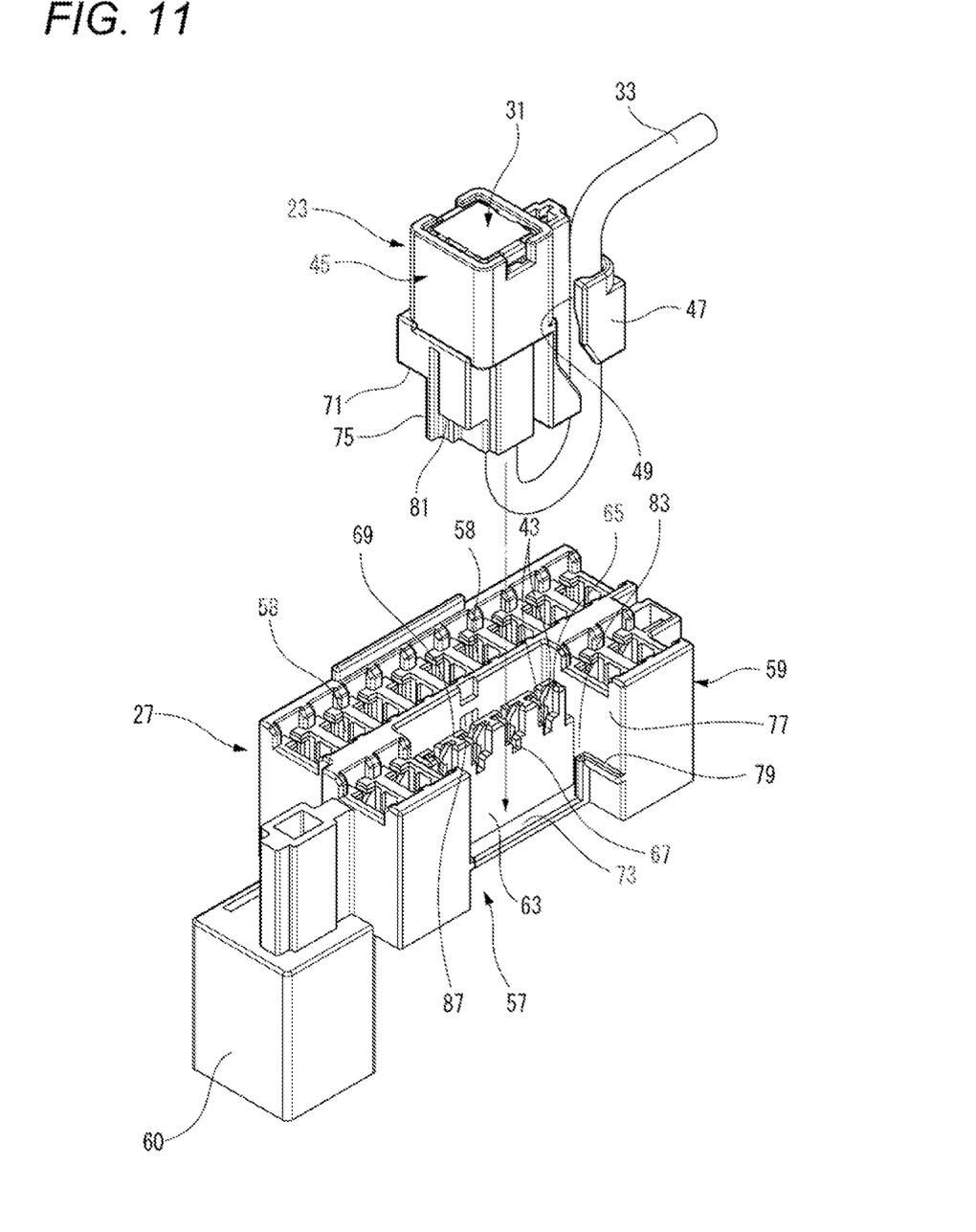
FIG. 11 is a perspective view of the spare connector connection block having a deformation prevention protection structure in a connector mounting portion.

FIG. 11 is a perspective view of the spare connector connection block 27 having a deformation prevention protection structure in the connector mounting portion 57. The spare connector connection block 27 has the deformation prevention protection structure in the connector mounting portion 57. The deformation prevention protection structure includes a peripheral wall portion 63 surrounding the exposed tuning fork terminal 29 in the connector mounting portion 57. The peripheral wall portion 63 prevents deformation of the tuning fork terminal 29 due to external force. The peripheral wall portion 63 has an upper opening portion 65 through which a pair of holding pieces 43 is exposed provided for each pair of holding pieces 43. Further, in the peripheral wall portion 63, a slit 67 into which the electric contact piece 41 of the power supply side connection terminal 37 and the power supply side terminal 39 of the blade fuse 51 can be inserted between the pair of holding pieces 43 is formed by being cut downward from the upper opening portion 65.

In the peripheral wall portion 63, a peripheral edge of the upper opening portion 65 serves as an opening upper end surface 69. The opening upper end surface 69 faces an upper step portion 71 of the fusible link socket 23 or the fuse socket 25 (see FIGS. 6 and 11). In a hem portion of the peripheral wall portion 63, a seating portion 73 parallel to the opening upper end surface 69 is formed to extend from the peripheral wall portion 63. A lower end of the engagement rib 75 of the fusible link socket 23 or the fuse socket 25 (see FIGS. 6 and 11) comes into contact with or comes close to the seating portion 73.

A placing rib 79 having a placing surface parallel to the opening upper end surface 69 is provided in a protruding manner on the inner wall surface 77 of the connector mounting portion 57. A lower step portion 81 of the fusible link socket 23 or the fuse socket 25 (see FIGS. 6 and 11) is placed on the placing rib 79. The placing rib 79 extends toward the peripheral wall portion 63, and is connected to the seating portion 73 in an L shape by hanging down with a gap with respect to the peripheral wall portion 63. The gap between the peripheral wall portion 63 and the banging placing rib 79 serves as an engagement groove 83. The engagement rib 75 is inserted into the engagement groove 83 from above.

Then, at least the lower step portion 81 of the fusible link socket 23 or the fuse socket 25 mounted on the connector mounting portion 57 of the spare connector connection block 27 is placed on the placing rib 79, and the engagement rib 75 is fitted into the engagement groove 83. Accordingly, the fusible link socket 23 or the fuse socket 25 is restricted from moving in a front-rear direction (a direction parallel to the inner wall surface 77 and perpendicular to the peripheral wall portion 63), a left-right direction (a longitudinal direction of the connector mounting portion 57), and a downward direction (a mounting direction of the fusible link socket 23 and the fuse socket 25 with respect to the connector mounting portion 57).

The fusible link socket 23 or the fuse socket 25 is selectively locked and fixed to the case body 13 and the spare connector connection block 27 via a locking mechanism that can be released from above the case body 13. The locking mechanism includes a lock arm 85 and an engagement recessed portion 87 shown in FIGS. 1 and 10.

For example, when the fusible link socket 23 is mounted on the spare connector mounting portion 17 or the connector mounting portion 57 of the spare connector connection block 27, the lock claw 89 is pressed and pushed in. When the fusible link socket 23 is inserted (mounted) to a predetermined position, the lock claw 89 of the lock arm 85 displaced by an elastic restoring force is locked to the engagement recessed portion 87.

Accordingly, the fusible link socket 23 is restricted from being detached from the spare connector mounting portion 17 or the connector mounting portion 57. On the other hand, when the lock arm 85 is moved using a jig or the like, the engagement with the engagement recessed portion 87 is released, and the fusible link socket 23 can be detached from the spare connector mounting portion 17 or the connector mounting portion 57.

Figure 12:
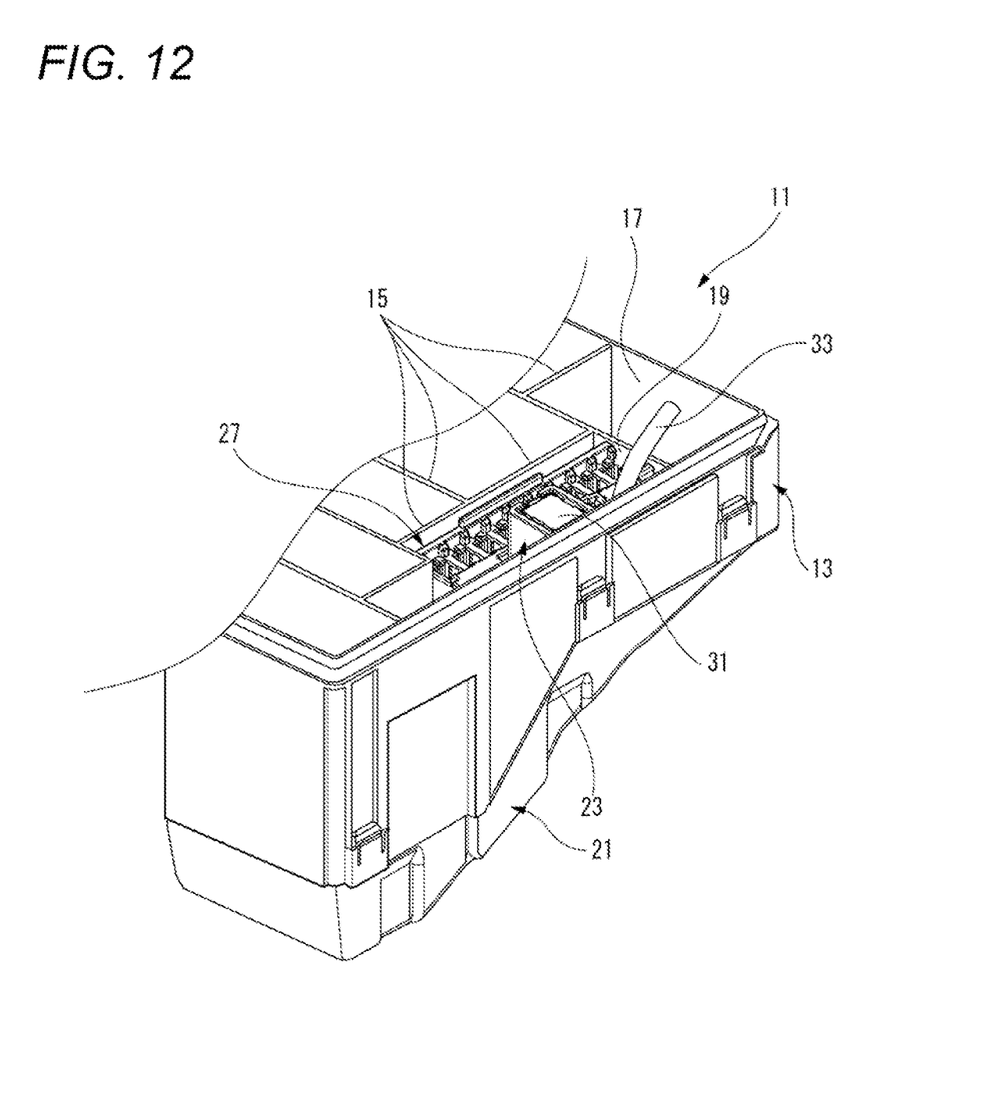
FIG. 12 is an enlarged perspective view of main parts of the case body showing a state in which the spare connector connection block on which the fusible link socket is mounted is mounted on the spare connector mounting portion.

FIG. 12 is an enlarged perspective view of main parts of the case body 13 showing a state in which the spare connector connection block 27 on which the fusible link socket 23 is mounted is mounted on the spare block mounting portion 19. In the electrical junction box 11 shown in FIG. 12, in a case where it is necessary to secure a power supply when an option, an after-part, or the like is added, the fusible link socket 23 is inserted into the spare connector connection block 27 mounted on the spare block mounting portion 19 of the case body 13. The fuse socket 25 may be inserted into the spare connector connection block 27.

Therefore, according to the electrical junction box 11, the power supply to which the fusible link 31 or the blade fuse 51 is connected in series to one spare connector connection block 27 can be easily taken out from the electrical junction box 11 later.

Next, functions of the above configuration will be described. In the electrical junction box 11 according to the present embodiment, the case body 13 includes a plurality of connector portions, the spare connector mounting portion 17, and the spare block mounting portion 19. The power supply side circuit board 10 is accommodated in the case body 13. The power supply side circuit board 10 is made of a highly conductive metal such as copper, and is integrally embedded and accommodated in the case body 13 made of an insulating resin, for example, at the time of molding.

The spare connector is detachably mounted on the spare connector mounting portion 17 or the spare block mounting portion 19 provided in the upper portion of the case body 13. The spare connector is the fusible link socket 23 or the fuse socket 25. Hereinafter, a case where the spare connector is the fuse socket 25 will be described as an example.

When the fuse socket 25 is mounted on the spare connector mounting portion 17 or the spare block mounting portion 19 of the case body 13, the blade fuse 51 is electrically connected in series between the power supply side circuit board 10 and the device side terminal 35 connected to an end of the electric wire 33 electrically connected to the electronic device.

The electric wire 33 led out from the fuse socket 25 passes through the fuse socket housing SS of the fuse socket 25 in the upper-lower direction and is led out to the upper portion. As a result, in the electrical junction box 11 according to the present embodiment, it is only necessary to insert (mount) the fuse socket 25 into the spare connector mounting portion 17 or the spare block mounting portion 19 in the upper portion of the case body 13 even in a case where it is necessary to secure a power supply when an option, an after-part, or the like is added.

That is, the power supply via the blade fuse 51 can be easily taken out from the electrical junction box 11 later. As a result, it is not necessary to detach the lower cover 21 from the case body 13 and disassemble the electrical junction box 11, and an external power supply can be easily taken without complicated work.

In the electrical junction box 11 according to the present embodiment, in the spare connector mounting portion 17 and the spare block mounting portion 19, the power supply side terminal 39 of the blade fuse 51 mounted on the fuse socket 25 can be electrically connected to the terminal portion 14 or the tuning fork terminal 29, which is a part of the terminal connection portions of the power supply side circuit board 10. The blade fuse 51 includes the power supply side terminal 39 on one side and the load side terminal 53 on the other side.

When the fuse socket 25 is mounted on the spare connector mounting portion 17 or the spare block mounting portion 19 of the case body 13, the power supply side terminal 39 of the blade fuse 51 mounted on the fuse socket 25 is electrically connected to the power supply side circuit board 10 accommodated in the case body 13 of the electrical junction box 11.

The power supply side terminal 39 of the blade fuse 51 is connected to the load side terminal 53 via a fusible part. The device side terminal 35 connected to the end of the electric wire 33 is electrically connected to the load side terminal 53. That is, the electric wire 33 to which the device side terminal 35 is attached to the end is connected to the load side terminal 53 of the blade fuse 51 in the fuse socket and led out to the outside of the fuse socket 25.

Therefore, according to the electrical junction box 11, the electric wire 33 connecting the blade fuse 51 in series with the power supply side circuit board 10 can be easily taken out via the fuse socket 25 mounted on the spare connector mounting portion 17 or the spare block mounting portion 19 of the case body 13.

In the electrical junction box 11 according to the present embodiment, the fuse socket 25 includes the electric wire holding portion 47. When the fuse socket 25 attached with the blade fuse 51 is mounted on the spare connector mounting portion 17 or the spare block mounting portion 19, the power supply side terminal 39 of the blade fuse 51 is electrically connected to the power supply side circuit board 10 of the case body 13. In the blade fuse 51 in which the power supply side circuit board 10 is connected to the power supply side terminal 39, the device side terminal 35 is electrically connected to the load side terminal 53 inside the fuse socket 25. The device-side terminal 35 connected to the load side terminal 53 of the blade fuse 51 is attached to the end of the electric wire 33.

Since the device side terminal 35 is inserted from below the fuse socket 25, the electric wire 33 to which the device side terminal 35 is attached to the end extends downward of the fuse socket 25 and is led out. The electric wire holding portion 47 formed in the fuse socket 25 holds the electric wire 33 extending to the lower side of the fuse socket 25 by bending the electric wire 33 by 180 degrees in a semicircular arc shape, for example, so that the electric wire 33 led out from the lower side can be held in a state of being pulled out above the fuse socket 25.

Accordingly, in the electrical junction box 11 of the present embodiment, when the fuse socket 25 is mounted on the upper portion of the case body 13, the electric wire 33 can be easily led out from the upper portion of the case body 13.

Further, in the electrical junction box 11 of the present embodiment, the locking mechanism is provided between the spare connector mounting portion 17 or the spare block mounting portion 19 and the fuse socket 25. The locking mechanism includes, for example, the lock arm 85 and the engagement recessed portion 87. In the locking mechanism, the lock arm 85 is provided in the fuse socket 25, and the engagement recessed portion 87 is provided in the spare connector mounting portion 17 or the spare block mounting portion 19. When the lock arm 85 is engaged with the engagement recessed portion 87, the fuse socket 25 is restricted from being detached from the spare connector mounting portion 17 or the spare block mounting portion 19.

By mounting the fuse socket 25 on the spare connector mounting portion 17 or the spare block mounting portion 19, the locking mechanism elastically deforms the lock arm 85, and locks by engagement with the engagement recessed portion 87 at a predetermined mounting position. The lock arm 85 locked to the engagement recessed portion 87 is formed so as to be movable in a direction away from the engagement recessed portion 87 from above the case body 13.

As a result, in the electrical junction box 11 according to the present embodiment, the fuse socket 25 can be fixed to the spare connector mounting portion 17 or the spare block mounting portion 19 with a one-touch operation. Further, in the electrical junction box 11 according to the present embodiment, by operating the lock arm 85 from above the case body 13, it is possible to release the lock at the upper portion of the case body 13 and to easily attach and detach the fuse socket 25.

In the above description, a case where the spare connector is the fuse socket 25 has been described as an example, and the same effect as described above can be obtained even in a case where the spare connector is the fusible link socket 23 on which the fusible link 31 is mounted. Therefore, according to the electrical junction box 11 of the present embodiment, an external power supply can be easily taken without complicated operation.

According to an aspect of the embodiments described above, an electrical junction box (11) includes a case body (13) having a plurality of connector portions, a power supply side circuit board (10) accommodated in the case body and a spare connector mounting portion (17, spare block mounting portion 19, for example) provided in an upper portion of the case body (13) and configured such that a spare connector (for example, fusible link socket 23, fuse socket 25) is attached to and detached from the spare connector mounting portion. The spare connector includes a fuse (for example, fusible link 31, blade fuse 51) configured to electrically connect the power supply side circuit board (10) to a device side terminal (35) connected to an end of an electric wire (33) configured to be electrically connected to an electronic device.

According to the electrical junction box (11) having the configuration described above, the case body (13) includes the plurality of connector portions, and the spare connector mounting portion (17, spare block mounting portion 19). The power supply side circuit board (10) is accommodated in the case body. The power supply side circuit board is made of, for example, a highly conductive metal such as copper, and is accommodated inside a case body made of an insulating resin. The spare connector (fusible link socket 23, fuse socket 25) is detachably attached to the spare connector mounting portion provided in the upper portion of the case body. The spare connector includes a fuse (fusible link 31, blade fuse 51). When the spare connector is mounted on the spare connector mounting portion of the case body, the fuse is electrically connected in series between the power supply side circuit board and the device side terminal (35) connected to the end of the electric wire (33) electrically connected to the electronic device. The electric wire led out from the spare connector passes through the connector housing (the fusible link socket housing 45 and the fuse socket housing 55) of the spare connector in the upper-lower direction and is led out to the upper portion. As a result, according to the electrical junction box having the configuration, it is only necessary to insert (mount) the spare connector into the spare connector mounting portion in the upper portion of the case body even in a case where it is necessary to secure a power supply when an option, an after-part, or the like is added. That is, the power supply via the fuse can be easily taken out from the electrical junction box later. As a result, it is not necessary to detach the lower cover (21) from the case body and disassemble the electrical junction box, and an external power supply can be easily taken without complicated work.

A power supply side terminal (39) of the fuse (the fusible link 31, the blade fuse 51) may be configured to be electrically connected to a terminal connection portion (for example, the terminal portion 14, the tuning fork terminal 29) of the power supply side circuit board (10).

With this configuration, in the spare connector mounting portion (17, the spare block mounting portion 19), the power supply side terminal (39) of the fuse (the fusible link 31, the blade fuse 51) mounted on the spare connector (the fusible link socket 23, the fuse socket 25) can be electrically connected to a part of the terminal connection portions (the terminal portion 14, the tuning fork terminal 29) of the power supply side circuit board (10). The fuse (the fusible link 31, the blade fuse 51) includes the power supply side terminal (39) on one side and the load side terminal (53) on the other side. When the spare connector (the fusible link socket 23, the fuse socket 25) is mounted on the spare connector mounting portion (17, spare block mounting portion 19) of the case body (13), the power supply side terminal (39) of the fuse (the fusible link 31, the blade fuse 51) mounted on the spare connector (the fusible link socket 23, the fuse socket 25) is conductively connected to the power supply side circuit board (10) accommodated in the case body (13) of the electrical junction box (11). The power supply side terminal (39) of the fuse (the fusible link 31, the blade fuse 51) is connected to the load side terminal (53) via a fusible part. The device side terminal (35) connected to the end of the electric wire (33) is electrically connected to the load side terminal (53). That is, the electric wire (33) to which the device side terminal (35) is attached to the end is connected to the load side terminal (53) of the fuse (fusible link 31, blade fuse 51) in the spare connector (the fusible link socket 23, the fuse socket 25), and is led out to the outside of the spare connector (the fusible link socket 23, the fuse socket 25). As a result, according to the electrical junction box (11), the electric wire (33) connecting the fuse (the fusible link 31 and the blade fuse 51) in series with the power supply side circuit board (10) can be easily taken out via the spare connector (the fusible link socket 23, the fuse socket 25) mounted on the spare connector mounting portion (17, the spare block mounting portion 19) of the case body (13).

The spare connector (the fusible link socket 23, the fuse socket 25) may include an electric wire holding portion (47) configured to hold an electric wire (33), one end of which is connected to the device side terminal (35) accommodated in a connector housing (for example, the fusible link socket housing 45, the fuse socket housing 55) and extending toward a lower side of the spare connector, in a state of being pulled out toward an upper side of the spare connector.

With this configuration, the spare connector (the fusible link socket 23, the fuse socket 25) includes the electric wire holding portion (47). When the spare connector (the fusible link socket 23, the fuse socket 25) attached with the fuse (the fusible link 31, the blade fuse 51) is mounted on the spare connector mounting portion (17, spare block mounting portion 19), the power supply side terminal (39) of the fuse (the fusible link 31, the blade fuse 51) is conductively connected to the power supply side circuit board (10) of the case body (13). In the fuse (the fusible link 31, the blade fuse 51) in which the power supply side circuit board (10) is connected to the power supply side terminal (39), the device side terminal (35) is electrically connected to the load side terminal (53) inside the spare connector (the fusible link socket 23, the fuse socket 25). The device-side terminal connected to the load side terminal of the fuse is attached to the end of the electric wire (33). Since the device side terminal is inserted from below the spare connector, the electric wire to which the device side terminal is attached to the end extends to the lower side of the spare connector and is led out. The electric wire holding portion formed in the spare connector holds the electric wire extending to the lower side of the spare connector by bending the electric wire by 180 degrees in a semicircular arc shape, for example, so that the electric wire led out from the lower side can be held in a state of being pulled out above the spare connector. Therefore, according to the electrical junction box having the configuration, when the spare connector is mounted on the upper portion of the case body, the electric wire can be easily led out from the upper portion of the case body.

The spare connector (the fusible link socket 23, the fuse socket 25) may be configured to be locked and fixed to the spare connector mounting portion (17, spare block mounting portion 19) via a locking mechanism (for example, the lock arm 85 and the engagement recessed portion 87) configured to be released from above the case body (13).

With this configuration, the locking mechanism (the lock arm 85 and the engagement recessed portion 87) is provided between the spare connector mounting portion (17, the spare block mounting portion 19) and the spare connector (the fusible link socket 23, the fuse socket 25). The locking mechanism includes, for example, the lock arm (85) and the engagement recessed portion (87). In the locking mechanism, for example, the lock arm is provided in the spare connector, and the engagement recessed portion is provided in the spare connector mounting portion. When the lock arm is engaged with the engagement recessed portion, the spare connector is restricted from being detached from the spare connector mounting portion. By mounting the spare connector on the spare connector mounting portion, the locking mechanism elastically deforms the lock arm, and locks by engagement with the engagement recessed portion at a predetermined mounting position. The lock arm locked to the engagement recessed portion is formed so as to be movable in a direction away from the engagement recessed portion from above the case body. Accordingly, in the electrical junction box having the configuration, the spare connector can be fixed to the spare connector mounting portion by one-touch operation, and the lock arm is operated from above the case body (13), so that the lock can be released at the upper portion of the case body, and the spare connector can be easily attached and detached.

While the presently disclosed subject matter has been described with reference to certain exemplary embodiments thereof, the scope of the presently disclosed subject mutter is not limited to the exemplary embodiments described above, and it will be understood by those skilled in the art that various changes and modifications may be made there is without departing from the scope of the presently disclosed subject matter as defined by the appended claims.

What is claimed is:

1. An electrical junction box comprising:
    a case body having a plurality of connector portions;
    a power supply side circuit board accommodated in the case body;
    a spare connector mounting portion provided in an upper portion of the case body and configured such that a spare connector is attachable and detachable from the spare connector mounting portion; and
    the spare connector,
    wherein the spare connector includes:
        a connector housing configured to receive a fuse in an opening of the connector housing, at an upper side of the connector housing; and
        the fuse, the fuse electrically connecting the power supply side circuit board to a device side terminal connected to one end of an electric wire,
    the device side terminal is accommodated in the connector housing, and the electric wire is configured to be electrically connected to an electronic device, and
    the electric wire, from the one end which is connected to the device side terminal accommodated in the connector housing, extends toward a lower side of the spare connector and then towards an upper side of the spare connector.
2. The electrical junction box according to claim 1, wherein a power supply side terminal of the fuse electrically connected to a terminal connection portion of the power supply side circuit board.
3. The electric junction box according to claim 1, wherein the spare connector includes an electric wire holding portion configured to hold the electric wire, in a state of being pulled out toward an upper side of the spare connector.
4. The electrical junction box according to claim 1, wherein the spare connector is configured to be locked and fixed to the spare connector mounting portion via a locking mechanism configured to be released from above the case body.
5. The electrical junction box according to claim 3, wherein the electric wire extends out of an opening of the connector housing, at a lower side of the connector housing, and then towards the upper side of the spare connector in a first direction through the electric wire holding portion.
6. The electrical junction box according to claim 5, wherein, in a plan view of the electrical junction box, the electric wire holding portion has a C shape that is configured to receive the electric wire in a second direction perpendicular to the first direction.

* * * * *